United States Patent [19]
Manfredi

[11] 3,967,445
[45] July 6, 1976

[54] EXHAUST PURIFIER SYSTEM

[76] Inventor: Frank A. Manfredi, 2026 W. 95th St., Cleveland, Ohio 44102

[22] Filed: June 21, 1974

[21] Appl. No.: 481,489

Related U.S. Application Data

[63] Continuation of Ser. No. 281,542, Aug. 17, 1972, abandoned.

[30] Foreign Application Priority Data
Dec. 24, 1972 Italy ................................ 32916/72
Feb. 22, 1972 Italy ................................ 20889/72

[52] U.S. Cl. ................................ 60/279; 60/297; 60/298; 60/310; 60/320; 60/39.5; 23/277 C; 165/90
[51] Int. Cl.² ............................................ F01N 3/10
[58] Field of Search ................ 165/86, 89, 90, 92, 165/8, 51, 52; 60/320, 282, 279, 297, 298, 310, 274, 39.5, 39.51 H; 23/277 C

[56] References Cited
UNITED STATES PATENTS

| | | | |
|---|---|---|---|
| 1,042,347 | 10/1912 | Herriot | 181/55 X |
| 1,764,535 | 6/1930 | Simmon | 165/92 |
| 1,864,915 | 6/1932 | Kosterman | 60/307 |
| 3,142,150 | 7/1964 | Pearlman | 60/303 X |
| 3,166,895 | 1/1965 | Slayter et al. | 60/307 |
| 3,248,872 | 5/1966 | Morrell | 60/274 |
| 3,302,394 | 2/1967 | Pahnke et al. | 60/302 |
| 3,456,439 | 7/1969 | Hale | 60/320 |
| 3,477,227 | 11/1969 | Bettega et al. | 60/297 X |
| 3,492,980 | 2/1970 | Beck | 60/279 X |
| 3,621,652 | 11/1971 | Demaree | 60/310 X |
| 3,666,422 | 5/1972 | Rossel | 60/297 |
| 3,685,616 | 8/1972 | Malkiewicz | 181/55 X |
| 3,725,012 | 4/1973 | Gower | 60/297 |
| 3,803,813 | 4/1974 | Yuzawa | 60/310 |

FOREIGN PATENTS OR APPLICATIONS

| | | | |
|---|---|---|---|
| 729,487 | 3/1966 | Canada | 165/92 |
| 22,462 | 7/1921 | France | 181/55 |

*Primary Examiner*—C. J. Husar
*Assistant Examiner*—Robert E. Garrett
*Attorney, Agent, or Firm*—Woodling, Krost, Granger & Rust

[57] ABSTRACT

A system for purifying heated exhaust gases discharged from an internal combustion engine, a furnace, or the like. The system includes a novel rotating finned tube heat exchanger of generally cylindrical configuration. The exchanger has a plurality of longitudinally extending conduits which direct the exhaust gases back and forth between opposite end chambers of the heat exchanger. The gases are additionally passed, as required depending upon the type of pollutants they contain, through a series of purification devices which may include a novel afterburner to rid the gases of entrained unburned fuel, one or more water bath devices to cleanse the gases, and a separator to removed unburned compounds.

11 Claims, 14 Drawing Figures

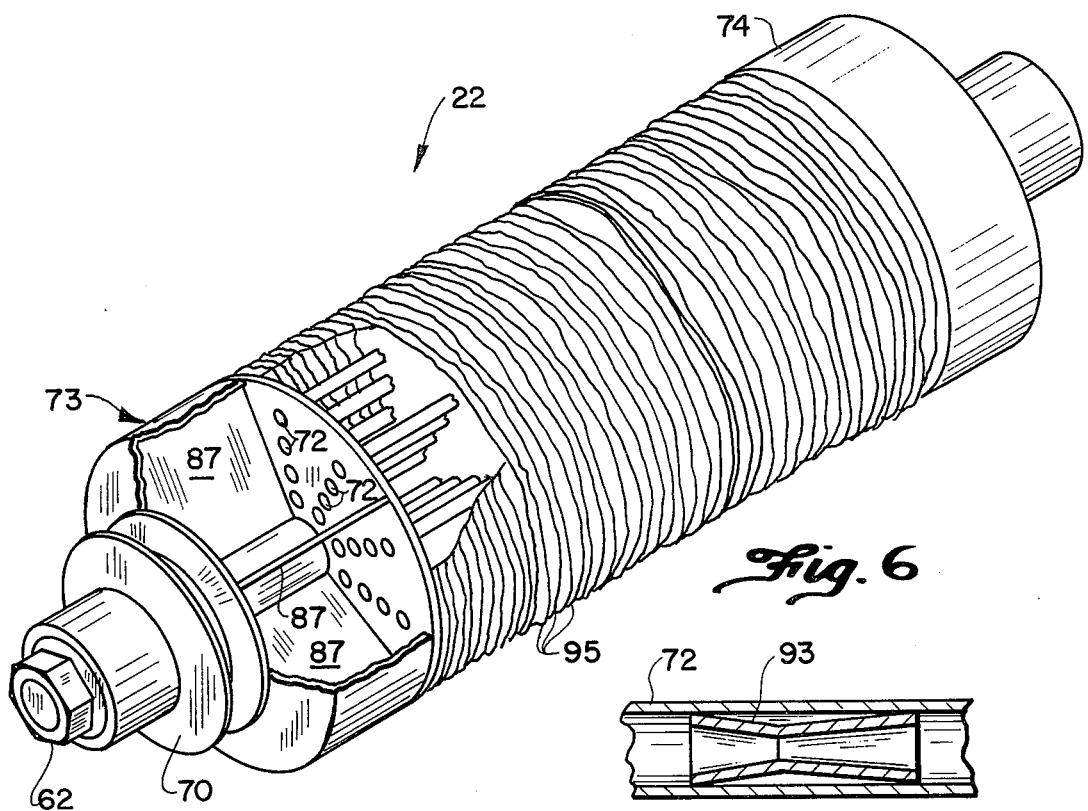
Fig. 6
Fig. 10
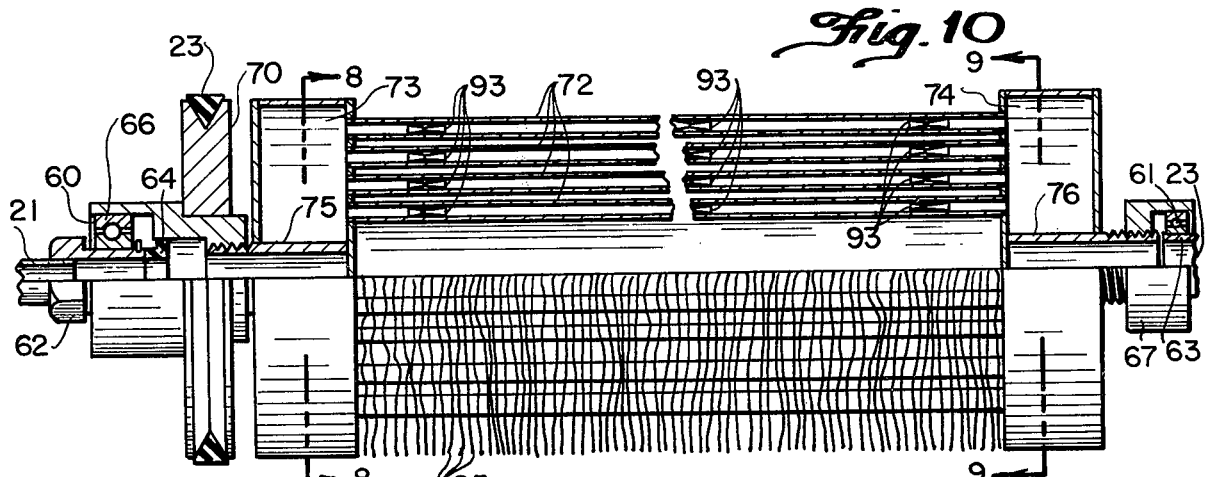
Fig. 7
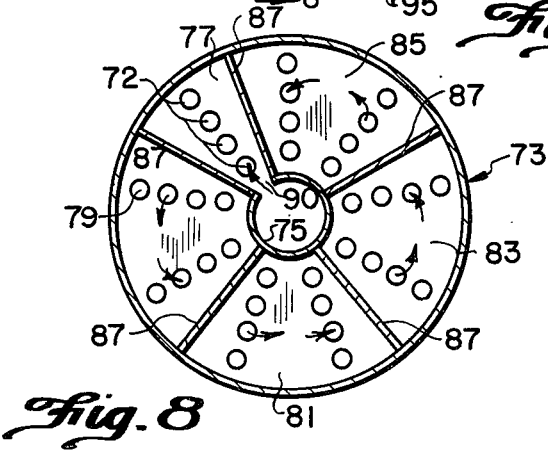
Fig. 8
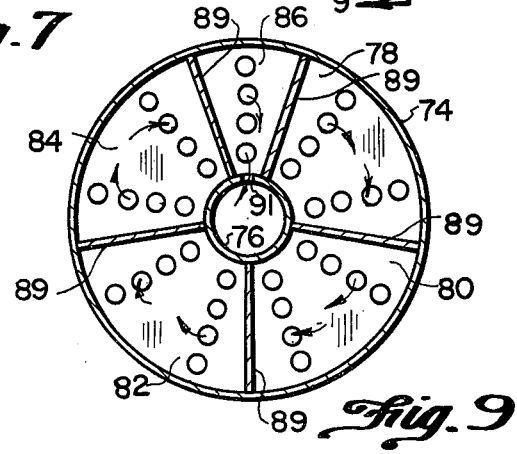
Fig. 9

3,967,445

EXHAUST PURIFIER SYSTEM

This is a continuation of application Ser. No. 281,542 filed Aug. 17, 1972, now abandoned.

BACKGROUND OF THE INVENTION

1. Field of the Invention

The present invention relates to exhaust purification equipment and more particularly to an apparatus for eliminating harmful agents from the exhausts of such devices as internal combustion engines, smokestacks and chimneys of buildings.

2. Prior Art

Many proposals have been made for exhaust purification systems to remove harmful pollution agents from the exhaust of furnaces, internal combustion engines, and the like. Most proposed systems have resulted in cumbersome arrangements of expensive equipment. Most proposed systems additionally fail to take into account the need to cool the exhaust gases in a controlled environment to render them less active and less liable to produce such pollutants as nitrous oxide when combined with oxygen.

SUMMARY OF THE INVENTION

The present invention overcomes the foregoing drawbacks of the prior art and provides a novel and improved exhaust purification system the components of which occupy a minimum of space and are relatively inexpensive in comparision with most known exhaust purification systems.

In accordance with one important aspect of the present invention, a rotating heat exchanger of novel and highly efficient design is provided to cool the exhaust gases. The heat exchanger includes a plurality of finned tubes for passing the gases back and forth a plurality of times along the heat exchanger as the exchanger rotates. Air currents are established by the rotation of the heat exchanger which increase the efficiency of the heat exchanger in dissipating heat from the gases.

A purifier or burner unit is provided through which exhaust gases containing hydrocarbon agents can be passed to burn off the hydrocarbons. The burner does not use any external source of energy to effect burning of the hydrocarbons, but rather provides a reflective "heat trap" which absorbs heat energy from the exhaust gases impinging thereon and attains a temperature that is effective to burn the hydrocarbon agents from the exhaust gases. Air is introduced into the purifier whereby carbon monoxide is converted into harmless carbon dioxide.

A separator unit is provided for removing unburned compounds from the gases. A funnel-shaped member is provided in spaced alignment with a conduit delivering exhaust gases to the separator. The heavier unburned compounds are directed by their momentum into the funnel, while the lighter purified gases pass around the funnel and are discharged to the atmosphere. Unburned compounds entering the funnel are either collected or recycled back to the engine or furnace for burning.

One or more water baths may be incorporated in the system to wash the gases and further enhance their purification. Accordingly, it is a general object of the present invention to provide a novel and improved exhaust purification system.

Other objects and a fuller understanding of the invention may be had by referring to the following description and claims taken in conjunction with the accompanying drawings.

BRIEF DESCRIPTION OF THE DRAWINGS

FIG. 6 is an enlarged perspective view of the heat exchanger component of the present invention;

FIG. 7 is an enlarged side elevational view partially in cross section of the heat exchanger;

FIG. 8 is a cross-sectional view as seen from the plane indicated by the line 8—8 in FIG. 7;

FIG. 9 is a cross-sectional view as seen from the plane indicated by the line 9—9 in FIG. 7

FIG. 10 is an enlarged cross-sectional view of a portion of the heat exchanger;

DESCRIPTION OF THE PREFERRED EMBODIMENT

Figure 1:
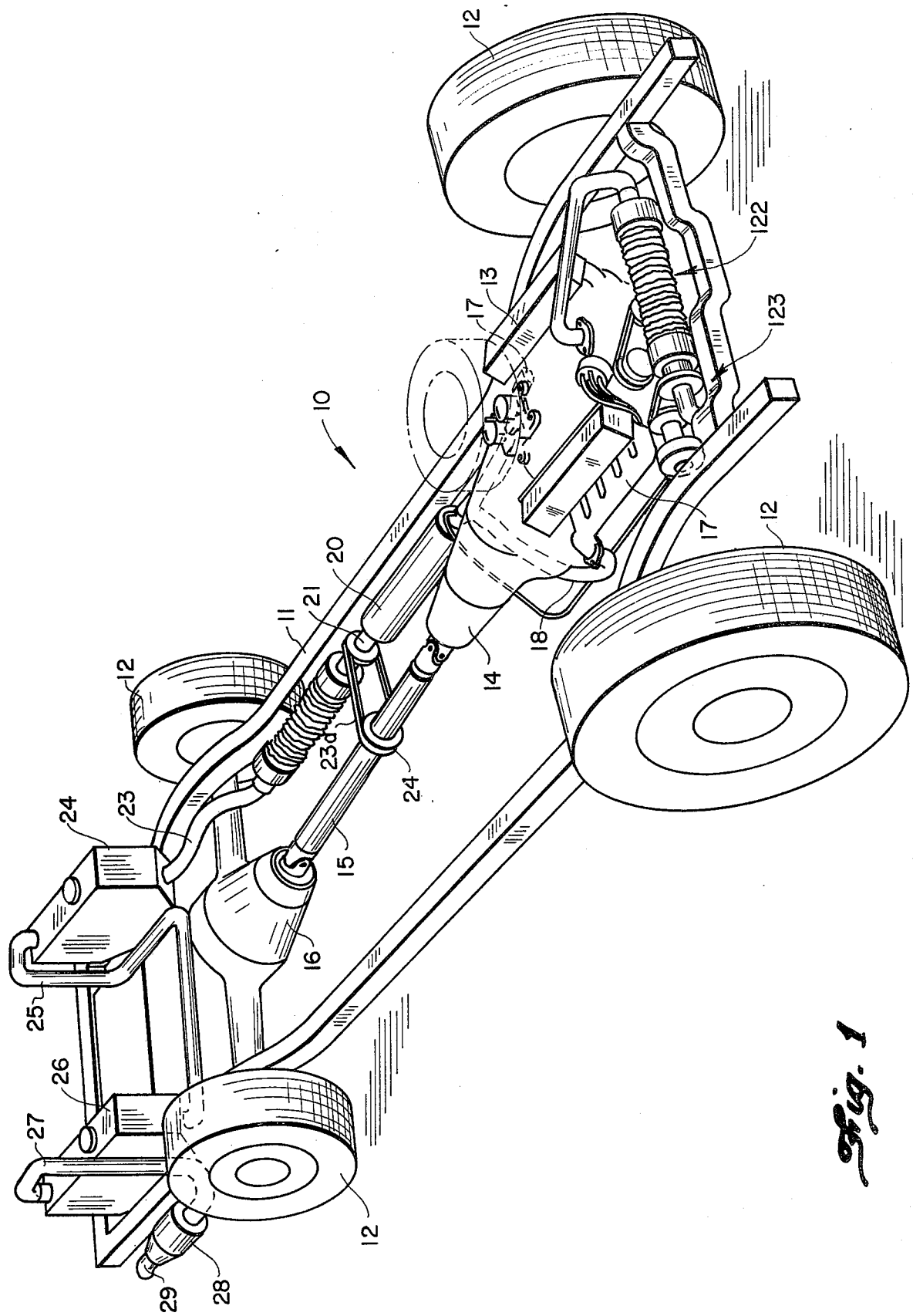
FIG. 1 is a perspective view of the exhaust purifier of the present invention installed in a motor vehicle to purify exhaust gases discharging from the engine of the vehicle.
Figure 2:
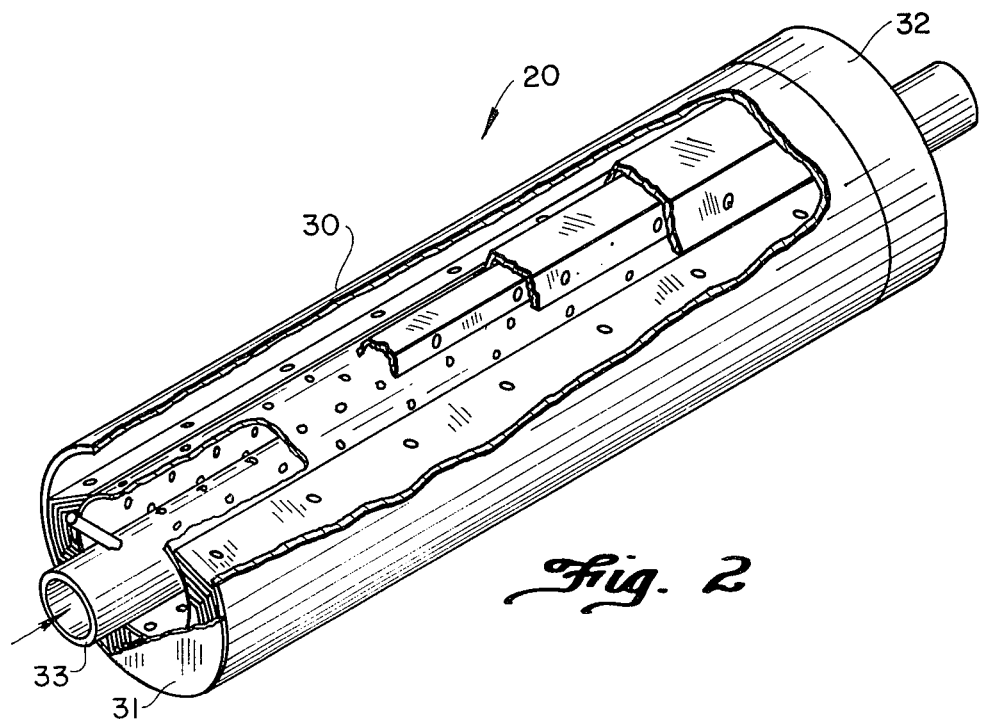
FIG. 2 is an enlarged perspective view of the purifier component of the exhaust system with portions of the purifier broken away to illustrate several details of construction.
Figure 3:
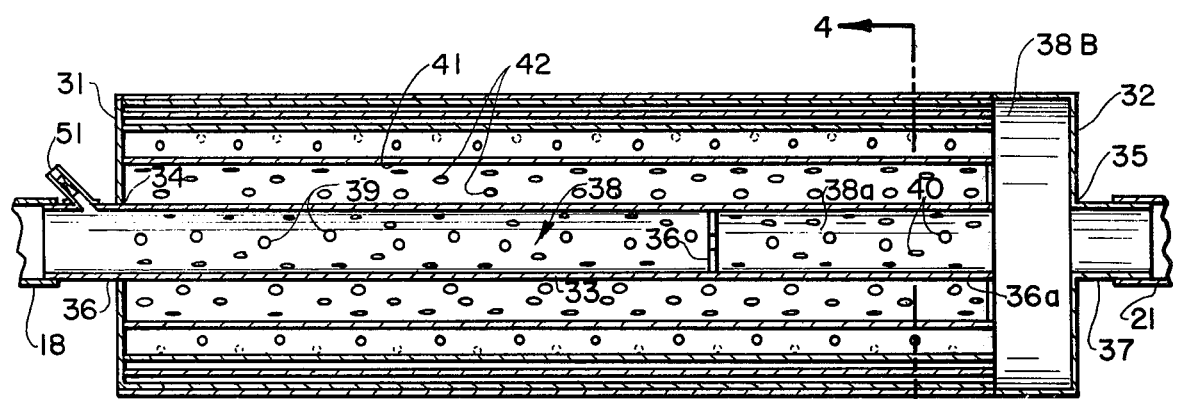
FIG. 3 is a cross-sectional view of the purifier.

Referring to FIG. 1, a motor vehicle is shown generally at 10 as including a frame 11 supported on ground-engaging wheels 12. An engine 13 is mounted on the frame 11 and supplies power through a power takeoff 14 to a drive shaft 15 and through a transaxle 16 to drive the rear wheels of the vehicle. As will be appreciated, in transaxle vehicles, the drive shaft 15 rotates continuously with the engine 13.

Exhaust manifolds 17 are provided in the conventional manner on opposite sides of the engine 13. A Y-shaped exhaust pipe 18 connects with the exhaust manifolds 17 and channels exhaust gases from the manifolds 17 into an exhaust purifier 20. The exhaust gases pass through the purifier 20 in a manner which will be explained and are discharged through a pipe 21 into a heat exchanger unit 22.

The heat exchanger unit 22 is, as will be explained, of the rotary type and operates most efficiently to dissipate heat from the exhaust gases when rotated. A belt 23a is reeved around a pulley 24 on the drive shaft 15 and around a pulley 70 carried by the heat exchanger 22 to rotate the heat exchanger 22 concurrently with the rotation of the drive shaft 15.

Exhaust gases discharging from the heat exchanger 22 are transmitted by a pipe 23 into a first washing device 19 where the gases are passed through a water bath. A pipe 25 then channels the exhaust gases into a second washing device 26 where the gases are passed through a second water bath. Exhaust gases discharging from the washing device 26 are transmitted by a pipe 27 into a separator 28 which serves to remove unburned compounds from the gases. The particulate matter included among the unburned compounds is collected, while gaseous compounds are returned to the engine 13 for combustion. A pipe 29 vents the purified bases to the atmosphere.

Referring to FIGS. 2–5, the purifier 20 includes a generally cylindrical housing 30 closed at opposite ends by covers 31, 32. A pipe 33 extends centrally through the housing 30 and through an aligned aperture 34, formed in the cover 31 to define input and output end portions 36, 36a. The input end portion 36 connects with pipe 18 to receive exhaust gases from the engine 13. An output pipe 37 is secured to the cover 32 and connects with the pipe 21 to transmit the exhaust gases into the heat exchanger 22.

An apertured disc 35 is positioned midway along the length of the pipe 33 to divide the pipe into input and output chambers 38, 38a. The pipe 33 is provided with a series of radially extending through apertures 39 which communicate with the input chamber 38, and with a series of radially extending through apertures 40 which communicate with the output chamber 38a. By this arrangement, a plurality of paths are formed between the input and output chambers 38, 38a. The disc 35 is provided with a plurality of apertures of such restricted size as will cause a majority of the exhaust gases to travel by paths of lesser resistance between the input and output chambers whereby some of the gases entering the input chamber 38 will pass through the apertures 39 and along the pipe 33 to enter the output chamber 38a through the apertures 40.

Figure 4:
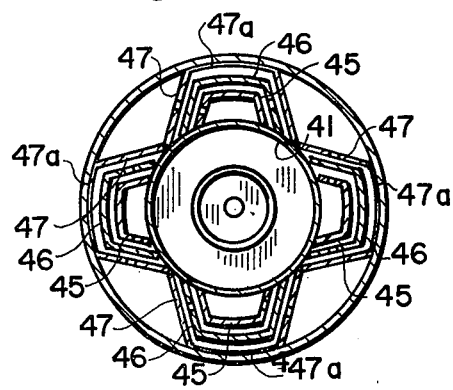
FIG. 4 is a cross-sectional view as seen from the plane indicated by the line 4—4 in FIG. 3.
Figure 5:
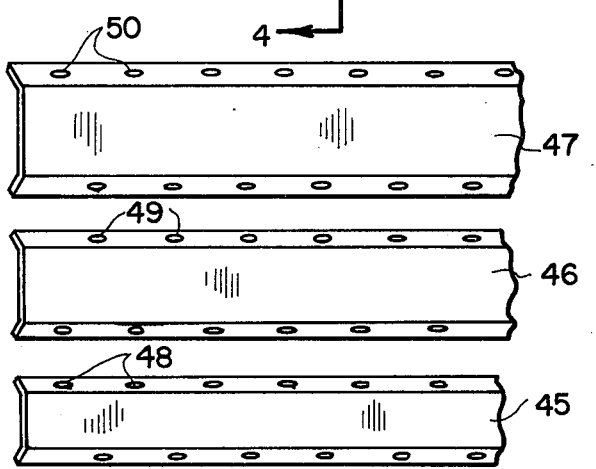
FIG. 5 is an enlarged side elevational view of portions of several of the components of the purifier.

A conduit 41 is positioned coaxially around the pipe 33 and extends between opposite end covers 31, 32 of the housing 30. U-shaped channel members 45, 46, 47 are disposed around the conduit 41 in four groups, as best shown in FIG. 4. The distal ends of the legs of each of the channel members 45, 46, 47 contact the peripheral wall of the conduit 41. Sheets of asbestos 47a separate the portions of the outer channel members 47 from the housing 30.

The conduit 41 and the channel members 45, 46, 47 are provided with a staggered array of through apertures 42 which extend radially through the wall of the conduit 41. Through apertures 48, 49, 50 are formed through the legs of the channel members 45, 46, 47. Some of the exhaust gases passing along the outer surface of the pipe 33 pass through the apertures 42 in the conduit 41 and reflect back and forth between the channel members 45, 46. In a similar fashion, some of the exhaust gases pass through the apertures 49, 50 and are reflected back and forth between the channel members 46, 47. The gases are accordingly caused to impinge on the conduit 41 and the channel members 45, 46, 47 whereby the conduit 41 and the channel members become heated to a temperature which will effect burning of the unburned fuel elements in the exhaust gases. A collecting chamber 38b is defined adjacent the output end of the purifier 20 to collect the purified gases for transmission into the pipe 21.

The end cover 31 can be apertured as required to admit such additional quantities of air as may be needed to effect burning of the hydrocarbons and to convert carbon monoxide into harmless carbon dioxide. The input end portion 36 of the pipe 33 can likewise be provided with a tubular structure 51 for admitting air to the purifier 20. The tubular structure 51 may, in the alternative, be used to extract a portion of the heated exhaust gases for other uses in conjunction with the operation of the vehicle 10. Other types of burners can also be used with the exhaust purifier system of the present invention.

Referring to FIGS. 6–10, the heat exchanger 22 comprises a generally cylindrical structure supported at opposite ends for rotation relative to the pipes 21, 23. Annular collars 62, 63 are positioned around and secured to the pipes 21, 23, and are journaled by bearings 60, 61. Annular hub members 66, 67 are positioned around the bearings 60, 61. A pair of pipes 75, 76 are threaded into the hub members 66, 67 and cooperate with the hub members 66, 67 to support the heat exchanger 22 at opposite ends. Seals one shown as 64, are interposed between the collars 62, 63 and the hub members 66, 67 to prevent leakage of exhaust gases. The grooved pulley 70 is secured to the annular member 66 and receives the belt 23a which serves to rotate the heat exchanger 22 concurrently with the drive shaft 15.

The heat exchanger 22 includes a series of tubular conduits 72 which serve to pass the exhaust gases back and forth a plurality of times between opposite end structures 73, 74. The end structure 73 includes a plurality of radially extending vanes 87 which divide the interior of the end structure 73 into a series of V-shaped chambers 77, 79, 81, 83, 85. The end structure 74 includes a plurality of radially extending vanes 89 which divide the interior of the end structure 74 into a series of V-shaped chambers 78, 80, 82, 84, 86. The tubular conduits 72 extend between the chambers 77–86 such that exhaust gases are channeled sequentially through the chambers 77, 78, 79, 80, 81, 82, 83, 84 and 85 to the chamber 86. Exhaust gases are transmitted into the chamber 77 from the pipe 21 through a radially extending aperture 90 formed in the wall of the pipe 75. Exhaust gases are discharged from the chamber 86 into the pipe 23 through a radially extending aperture 91 formed in the wall of the pipe 76.

Referring to FIG. 10 in conjunction with FIG. 7, the tubular conduits 72 may be provided with venturi-tube insert structures 93 at selected positions therealong to regulate the velocity of flow and to cause controlled expansion of the exhaust gases as they pass through the conduits 72. By this arrangement, the cooling efficiency of the heat exchanger 72 can be improved.

A plurality of thin metallic fins 95 are provided between the end regions 73, 74. The fins 95 engage conduits 72 and serve to facilitate the transfer of heat from the conduits to the air surrounding the heat exchanger. Rotation of the heat exchanger sets up currents of air through the fins 95 enabling the rapid dissipation of heat from the conduits 72.

Heat exchangers of the type described above can be used for a wide variety of purposes. By way of example, a heat exchanger 122 is shown substituted for the conventional cooling system radiator and fan. A suitable drive system 123 rotates the heat exchanger 122 concurrently with the engine crankshaft.

Other uses for such rotating heat exchangers include a wide variety of refrigeration, air conditioning and heating systems in widely varied applications such as fuel systems and transmission oil cooling systems for vehicles to atomic energy installations, hot water systems for homes, and the like.

The washing devices 19, 26 are not essential to the operation of the exhaust purifier system. They can be incorporated in the system as shown in FIG. 1 and can comprise any of a variety of known systems for passing gases through a bath of water.

Figure 11:
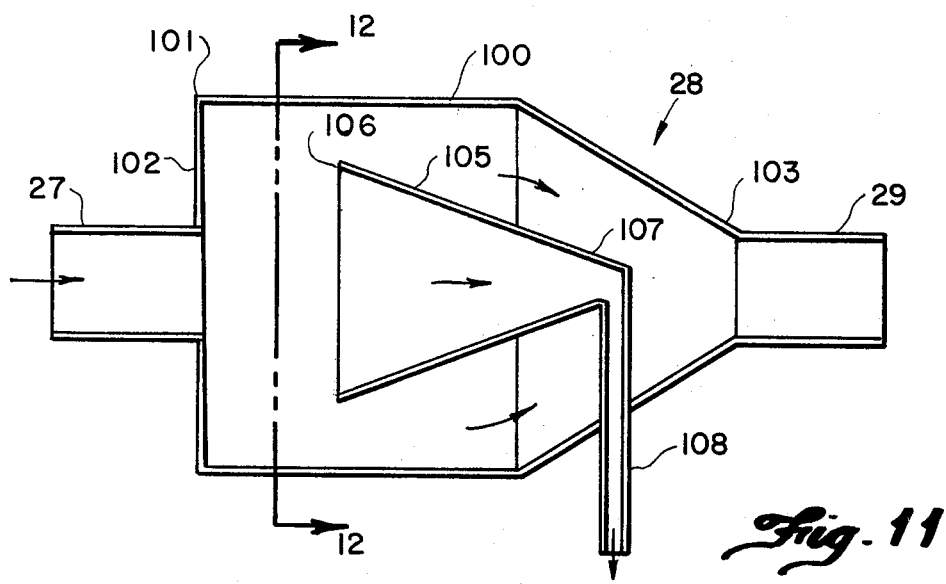
FIG. 11 is a schematic cross-sectional view of the separator component of the present invention.
Figure 12:
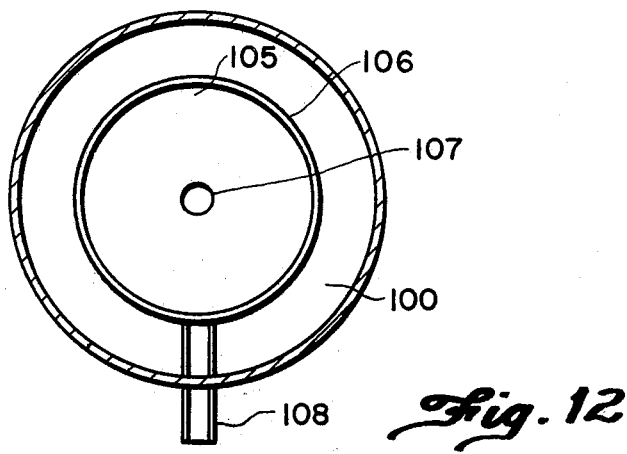
FIG. 12 is a cross-sectional view as seen from a plane indicated by the line 11—11 in FIG. 10.

Referring to FIGS. 11 and 12, the separator includes a funnel-shaped housing 100. The large end 101 of the housing 100 is closed by an annular plate 102 which couples with the pipe 27 to admit exhaust gases into the housing 100. The small end 103 of the housing 100 connects with the pipe 29 which discharges purified exhaust gases to the atmosphere.

A funnel 105 is positioned within the housing with the large end 106 of the funnel 105 positioned in alignment with and opening toward the pipe 27. The small end 107 of the funnel 105 connects with a tube 108. In operation, the heavier components of the exhaust gases will be directed by virtue of their momentum into the funnel 105, while the lighter purified gases will pass around the funnel 105 and discharge through the pipe 29. The collected components pass through the tube 108. Particulate matter passing through the tube 108 can be collected for subsequent disposal while the gaseous substances are returned by the tube 108 to the intake manifold of the engine 13 for subsequent combustion.

Figure 13:
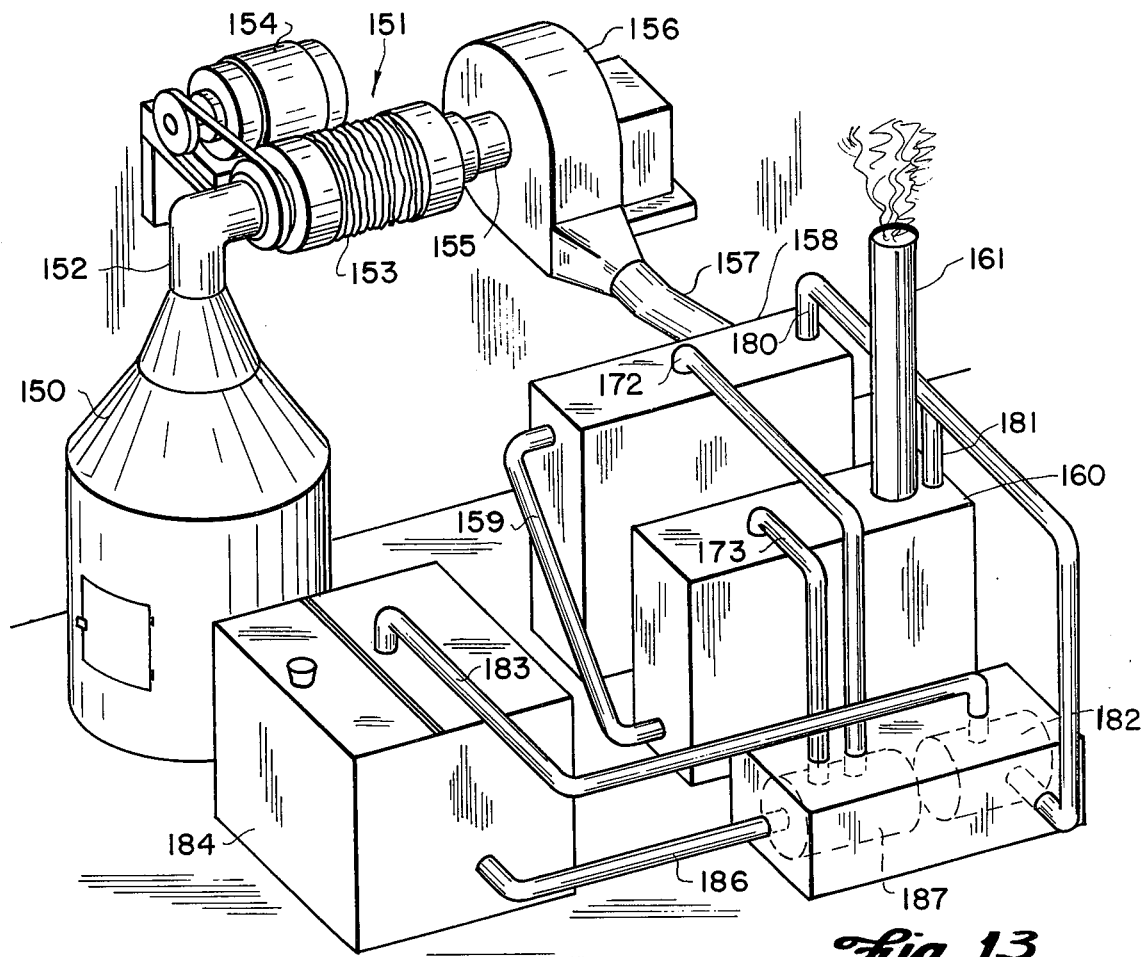
FIG. 13 is a perspective schematic view of the exhaust purifier system of the present invention coupled to a furnace to purify the gases exhausted from the furnace; and, FIG. 14 is a schematic side-elevational view of the system of FIG. 13 with portions thereof broken away to illustrate details of construction.
Figure 14:
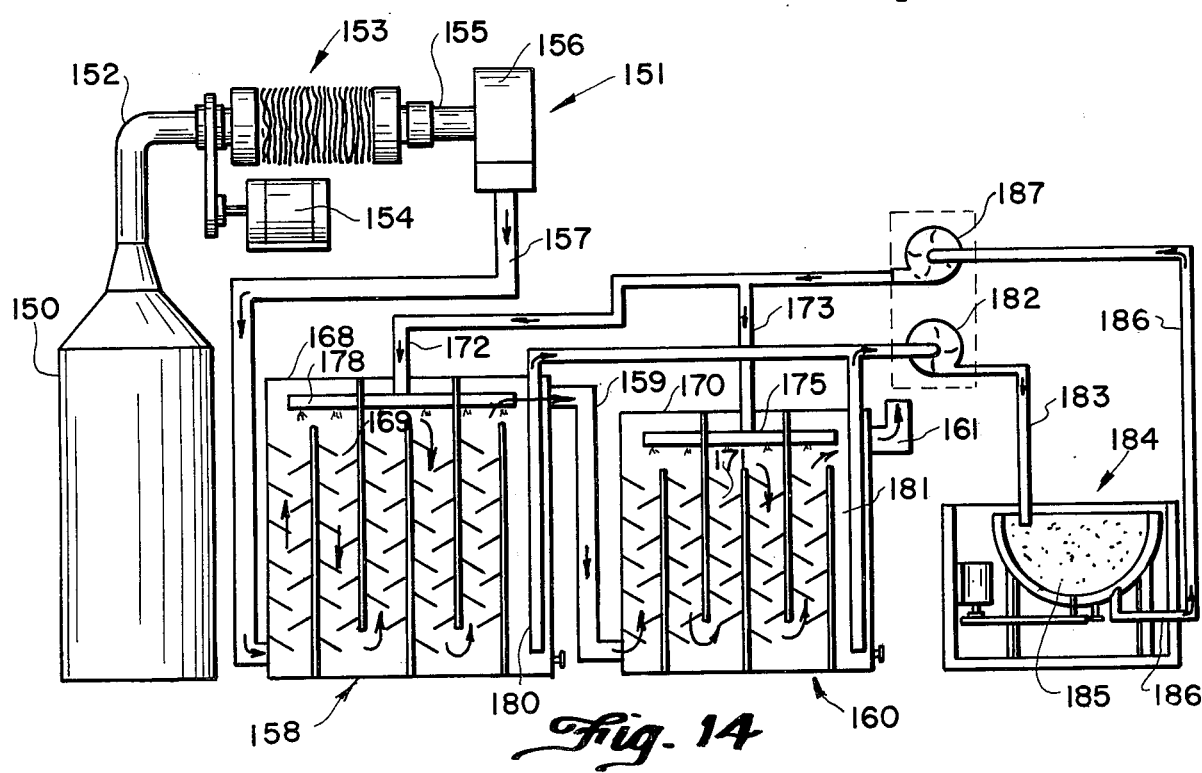

Referring to FIGS. 13 and 14 another embodiment of an exhaust purifier system constructed in accordance with the present invention is shown generally at 151 connected to a conventional furnace 150. The furnace 150 can comprise any of a variety of known furnace structures which burn fuel to generate heat, or can comprise a variety of other devices which discharge harmful fumes or gases.

The purifier system 151 includes a pipe 152 which directs gases exhausted by the furnace 150 into a rotary heat exchanger 153. The heat exchanger 153 is of the type previously described and is rotated by a motor 154.

If hydrocarbons are present in the exhaust gases, the cooled gases discharging from the heat exchanger can be passed into a purifier structure (not shown) of the type previously described. The tendency of the combustion gases to form nitrous oxide is overcome by cooling the gases in the heat exchanger to a temperature below about 1900°F. and by maintaining the operating temperature of the burner below about 1900°F. Carbon monoxide is changed to harmless carbon dioxide by introducing air into the exhaust gases as they pass through the purifier.

Assuming that hydrocarbon agents are not present beyond a desirable amount in the exhaust gases discharging from the heat exchanger 153, the gases are passed through a pipe 155 to a blower 156. The blower 156 exhausts the gases under pressure through a pipe 157 to a first washing device 158, from which the gases are channeled by a pipe 159 into a second washing device 160. Purified gases are discharged from the washing device 160 to the atmosphere through a pipe 161.

The washing devices 158, 160 include housings 168, 170 within which are positioned a series of baffles 169, 171. Water is delivered into the upper regions of the housings 168, 170 by conduits 172, 173 and is discharged through header structures 174, 175 downwardly over the baffles 169, 171. The baffles 169, 171 define tortuous paths of travel from the exhaust gases and serve to thoroughly spray wash the gases as they travel through the washing devices 158, 160.

The water which is used to wash the gases is retrieved from the washing devices 158, 160 by means of pipes 180, 181. A pump 182 connected to the pipes 180, 181 draws the water from the lower regions of the housings 168, 170 and discharges it through a pipe 183 into a filtering apparatus 184.

The filtering apparatus 184 includes a filtering receptacle 185 which holds suitable filtering and/or neutralizing agents to purify water for reuse in the washing devices. A pipe 186 delivers the purified water from the bottom of the receptacle 185 to a pump 187. The pump 187 connects with the conduits 172, 173 to return the purified water to the washing devices 158, 160.

If unburned compounds are still present in the gases exhausted through the pipe 161, a separator of the type previously described can be used to collect particulate matter and to recycle gaseous agents back to the furnace 150 for burning.

Although the invention has been described in its preferred form with a certain degree of particularity, it is understood that the present disclosure of the preferred form has been made by way of example and that numerous changes in the details of construction and the combination and arrangement of parts may be resorted to without departing from the spirit and the scope of the invention as hereinafter claimed.

What is claimed is:

1. In a motor vehicle of the type including a fuel burning engine from which exhaust gases are discharged, the engine driving a shaft, the improved exhaust purification system comprising:
   a. conduit means connected at one end to the engine for receiving exhaust gases discharged by the engine and discharging exhaust gases to the atmosphere through the other end;
   b. burner means interposed between said conduit ends to burn hydrocarbon agents present in the exhaust gases;
   c. heat exchanger means interposed between said conduit ends in series with said burner means for cooling the exhaust gases prior to their discharge to the atmosphere;
   d. said heat exchanger means comprising a rotating structure including an input at one end and an output at the other end with a plurality of longitudinally extending tubes forming a path through which the exhaust gases are passed which extends back and forth between said ends of said heat exchanger means a plurality of times enabling efficient heat transfer between said exhaust gases and said heat exchanger means;
   e. and means connecting said heat exchanger means to the driven shaft of the engine for rotating said heat exchanger means to direct ambient air currents across said tubes to cool said tubes and to thereby cool the gases being passed through the tubes.

2. A motor vehicle as set forth in claim 1, including venturi means interposed between said longitudinally extending tubes of said heat exchanger means for enabling a controlled expansion of the exhaust gases through said conduit means of said heat exchanger means for improving heat transfer thereof.

3. An improved exhaust purification system as set forth in claim 1, wherein said heat exchanger means is located below the underside of the motor vehicle.

4. An improved exhaust purification system as set forth in claim 1, wherein said burner means includes:
  I. a generally cylindrical housing closed at opposite ends and defining a chamber;
  II. an inlet conduit having an outer portion extending through one of said ends and an inner portion extending part way through said chamber along the longitudinal axis of said housing for introducing exhaust gases into said chamber;
  III. an outlet conduit connected to the other of said ends for discharging exhaust gases from said chamber;
  IV. said inner portion being provided with an array of spaced apertures for discharging exhaust gases from said inlet conduit into said chamber;
  V. a tubular conduit extending through said chamber in spaced surrounding relationship to said inner portion;
  VI. a plurality of channel members extending exteriorly of said tubular conduit in said chamber and cooperating with said tubular conduit to define a plurality of channels extending along said tubular conduit;
  VII. a plurality of holes formed through the wall of said tubular conduit to communicate the interior of said tubular conduit and said channels; and
  VIII. substantially all of said holes being arranged out of alignment with the apertures formed through said inner conduit portions enabling the exhaust gases to reflect back and forth between said channel members a plurality of times for heating said channel members to effect burning of the unburned exhaust gases.

5. An improved exhaust purification system as set forth in claim 4 wherein
  a. said channel members are U-shaped members arranged in groups to extend along said tubular conduit;
  b. each of said groups including a plurality of U-shaped channel members of progressively larger size overlying one another in spaced relationship with the smaller channel members positioned nearest to said tubular conduit;
  c. the smaller channel members having openings formed therethrough for admitting exhaust gases to the regions between the smaller and the larger channel members to reflect back and forth a plurality of turns between adjacent channel members.

6. An improved exhaust purification system as set forth in claim 5, wherein said plurality of channel members in each of said groups includes an inner channel member, an intermediate channel member, and an outer channel member of respectively progressively larger size, and said inner and intermediate channel members are provided with non-aligned openings for admitting exhaust gases along a tortuous path to the region between said inner and said intermediate channel members, and to the region between said intermediate and said outer channel members.

7. An improved exhaust purification system as set forth in claim 5, wherein the end regions of said tubular conduit and of said channel members nearest said outlet conduit terminate in spaced relationship to said other end of said housing to permit exhaust gases within said tubular conduit and within the space between said channel members to flow directly into said outlet conduit.

8. An improved exhaust purification system as set forth in claim 7, wherein said inlet conduit extends nearly the full length of said chamber stopping short of said other end, and an apertured disc is positioned in said inner portion midway along its length to restrict the flow of exhaust gas which would otherwise tend to flow directly through said inner portion toward said outlet conduit.

9. An improved exhaust purification system as set forth in claim 1 including separator means interposed between said conduit ends in series with and downstream from said heat exchanger means and said burner means to separate unburned compounds from the exhaust gases.

10. An improved exhaust purification system as set forth in claim 9 including water bath means interposed between said conduit end to wash the gases prior to their discharge to the atmosphere.

11. An improved exhaust purification system as set forth in claim 1 wherein the gas contains a mixture of larger and smaller solid particles and wherein said separator means includes:
  a. an outer housing having an inlet and an outlet for receiving and discharging exhaust gases, respectively,
  b. said outer housing tapering in cross-section from said inlet to a smaller cross-section at said outlet;
  c. an inner housing having an inlet and an outlet with a tapering cross-section from said inlet to a smaller cross-section at said outlet;
  d. and means mounting said inlet of said inner housing substantially coaxially with said inlet of said outer housing for receiving the exhaust gas larger particles in a generally straight axially aligned path and for establishing a curved path flow for receiving the exhaust gas smaller particles in said outer housing and circumventing said inner housing inlet.

* * * * *